(12) United States Patent
Wakabayashi (10) Patent No.: US 8,206,032 B2
(45) Date of Patent: Jun. 26, 2012

(54) TEMPERATURE SENSOR MOUNTING UNIT (75) Inventor: Yasuki Wakabayashi, Kanagawa (JP)

(73) Assignee: Piolax, Inc., Yokohama-Shi, Kanagawa (JP)

( * ) Notice: Subject to any disclaimer, the term of this patent is extended or adjusted under 35 U.S.C. 154(b) by 505 days.

(21) Appl. No.: 12/461,510

(22) Filed: Aug. 13, 2009

(65) Prior Publication Data
US 2010/0054303 A1 Mar. 4, 2010

(30) Foreign Application Priority Data

Aug. 27, 2008 (JP) ................................. 2008-217943

(51) Int. Cl.
*G01K 1/14* (2006.01)

(52) U.S. Cl. ........ 374/208; 374/163; 374/183; 374/100; 374/141; 73/866.5

(58) Field of Classification Search .................. 374/208, 374/163, 100, 141, 144, 183, 185, 179, 147, 374/148, 152, 150, 135; 73/866.5; 429/90; 136/200
See application file for complete search history.

(56) References Cited

U.S. PATENT DOCUMENTS

| | | | | |
|---|---|---|---|---|
| 4,669,763 A * | 6/1987 | Phillips | ........................ | 285/346 |
| 5,474,641 A * | 12/1995 | Otsuki et al. | .................. | 438/694 |
| 6,367,974 B1 * | 4/2002 | Lin | ................................ | 374/179 |
| 6,497,158 B1 * | 12/2002 | Daly et al. | .................... | 73/866.5 |
| 6,610,439 B1 * | 8/2003 | Kimoto et al. | .................. | 429/90 |
| 6,792,848 B1 * | 9/2004 | Janky | ................................ | 99/285 |
| 7,090,658 B2 * | 8/2006 | Faries et al. | .................... | 604/113 |
| 7,237,948 B2 | 7/2007 | Nakabayashi | | |
| 7,607,316 B2 * | 10/2009 | Park et al. | ........................ | 62/298 |
| 7,726,876 B2 * | 6/2010 | Laverdiere et al. | ........... | 374/125 |
| 7,824,101 B2 * | 11/2010 | Kloiber et al. | ................. | 374/147 |
| 8,033,718 B2 * | 10/2011 | Nishiyashiki | .................. | 374/141 |
| 2002/0069700 A1 * | 6/2002 | Dirmeyer et al. | ................ | 73/431 |
| 2003/0223474 A1 * | 12/2003 | Roepke | .......................... | 374/152 |
| 2004/0028118 A1 * | 2/2004 | Sidoni | ........................... | 374/208 |
| 2004/0165648 A1 * | 8/2004 | Ikeda et al. | .................... | 374/208 |
| 2005/0155408 A1 * | 7/2005 | Weyl et al. | .................... | 73/23.31 |
| 2005/0175066 A1 | 8/2005 | Nakabayashi | | |
| 2009/0022206 A1 * | 1/2009 | Shibuya et al. | ............... | 374/208 |
| 2010/0067562 A1 * | 3/2010 | Wakabayashi | ................ | 374/208 |
| 2012/0031517 A1 * | 2/2012 | Yoshida et al. | ............... | 138/103 |

FOREIGN PATENT DOCUMENTS

FR 2883103 A1 * 9/2006
JP 2005-227027 A 8/2005

* cited by examiner

*Primary Examiner* — Gail Verbitsky (74) *Attorney, Agent, or Firm* — McGinn IP Law Group, PLLC

(57) ABSTRACT

According to an aspect of the present invention, there is provided a temperature sensor mounting unit for mounting a temperature sensor to a mounting-target member at a mounting hole formed on a mounting wall thereof, the temperature sensor mounting unit including: a clip main body including: a base plate that is to be positioned on a front surface side of the mounting wall, the base plate having an installation hole formed therein, the installation hole allowing the temperature sensor to penetrate into a rear surface side of the mounting wall; and a plurality of elastic engagement pieces that extend from the base plate to be engaged with a circumferential edge of the mounting hole at the rear surface side of the mounting wall; and an elastic seal member configured to be disposed between the clip main body and the mounting wall.

8 Claims, 7 Drawing Sheets

TEMPERATURE SENSOR MOUNTING UNIT

CROSS-REFERENCE TO RELATED APPLICATIONS

This application claims priority from Japanese Patent Application No. 2008-217943 filed on Aug. 27, 2008, the entire contents of which are incorporated herein by reference.

BACKGROUND OF THE INVENTION

1. Field of the Invention

An aspect of the present invention relates to a temperature sensor mounting unit for mounting, for example, a temperature sensor for measuring an internal temperature in a battery of an electric vehicle or a temperature of a coolant for an internal combustion engine.

2. Description of the Related Art

In recent years, because of environmental issues, much attention is drawn to electric vehicles which employ electric motors as drive sources and hybrid vehicles which employ an internal combustion engine and electric motors as drive sources. In these types of vehicles, a battery is required to supply electric power to the electric motors.

When the internal temperature of the battery increases, there may be a case where the output of the electric motors is affected. Because of this, a temperature sensor for measuring the internal temperature of the battery may be mounted on an exterior casing of the battery.

In addition, for example, the temperature sensor may be mounted on a circumferential wall of a coolant supply pipe as a mounting-target member in order to measure the temperature of the coolant for the internal combustion engine.

JP-2005-227027-A discloses a temperature sensor accommodation mechanism including a cylindrical accommodation bush which provided on an outer circumference of a pipe having a cooling medium passage and a temperature sensor which is mounted concentrically in the accommodation bush and is disposed in such a manner that a distal end portion of the temperature sensor projects from an inner circumferential surface of the pipe, wherein a claw is formed on an outer circumference of the temperature sensor and an opening with which the claw is brought into engagement is formed in a cylindrical wall of the accommodation bush. The claw of the temperature sensor is brought into engagement with the opening in the accommodation bush, whereby the temperature sensor is mounted to the accommodation bush.

In the mounting unit disclosed in JP-2005-227027-A, he accommodation bush is provided on the outer circumference of the pipe (the mounting-target member) where the temperature sensor is to be mounted, and the opening with which the claw of the temperature sensor is brought into engagement needs to be provided in the circumferential surface of the accommodation bush, whereby the complicated construction on the mounting-target member is required.

In addition, in the aforesaid mechanism, since the claw of the temperature sensor comes into engagement with the opening in the accommodation bush, the mounting position of the temperature sensor relative to the accommodation bush is determined, and when the circumferential wall of the pipe is thick, the projecting amount of the distal end portion of the temperature sensor relative to the inner circumference of the pipe becomes small, whereas when the circumferential wall of the pie is thin, the projecting amount of the distal end of the temperature sensor becomes large. As a result, when this mounting mechanism is used to mount the temperature sensor on the mounting-target member and internal components are disposed thereinside, since the projecting amount of the temperature sensor varies in accordance with the thickness of the mounting-target member, the temperature sensor might interfere with the internal components of the mounting-target member, and measured values might vary largely because the position of the temperature sensor is not determined.

SUMMARY OF THE INVENTION

One of objects of the invention is to provide a temperature sensor mounting unit that can be easily applicable to a mounting-target member and that can hold the projecting amount of the temperature sensor to a rear side of a mounting hole for the temperature sensor constant irrespective of the thickness of a mounting wall of the mounting-target member.

According to an aspect of the present invention, there is provided a temperature sensor mounting unit for mounting a temperature sensor to a mounting-target member at a mounting hole formed on a mounting wall thereof, the temperature sensor mounting unit including: a clip main body including: a base plate that is to be positioned on a front surface side of the mounting wall, the base plate having an installation hole formed therein, the installation hole allowing the temperature sensor to penetrate into a rear surface side of the mounting wall; and a plurality of elastic engagement pieces that extend from the base plate to be engaged with a circumferential edge of the mounting hole at the rear surface side of the mounting wall; and an elastic seal member configured to be disposed between the clip main body and the mounting wall.

According to such configuration, by the elastic engagement pieces of the clip main body being forcibly inserted into the mounting hole in such a state that the temperature sensor is installed in the installation hole in the clip main body, the elastic engagement pieces are brought into engagement with the circumferential edge on the rear side of the mounting hole, while the elastic seal member is brought into elastic abutment with the front side of the mounting hole, whereby the temperature sensor can be mounted in the mounting hole in such a state that the mounting hole is sealed along the circumferential edge on the front side thereof. In this way, the temperature sensor can be mounted on the mounting-target member via the clip main body with the simple construction in which the mounting hole is provided in the mounting wall of the mounting-target member.

Since the elastic seal member which is interposed between the mounting-target member and the clip main body is made to deform as required even though the thickness of the mounting wall of the mounting-target member, the projecting amount of the temperature sensor towards the rear side of the mounting hole can be held constant. As a result, the interference of the temperature sensor with the internal components of the mounting-target member or variation of measured values due to the position shift of the temperature sensor can be prevented.

Further, since the elastic seal member is brought into abutment with the circumferential edge on the front side of the mounting hole so as to the airtightness is increased, a leakage of an inside fluid to the outside of the mounting unit or inflow of an outside fluid into the mounting unit is made difficult, whereby an accurate measurement by the temperature sensor can be implemented.

According to another aspect of the present invention, there may be provided the temperature sensor mounting unit, wherein the clip main body further includes: a plurality of rib walls that are disposed between the plurality of elastic engagement pieces to be disposed along an inner circumference of the mounting hole, wherein, in a mounted state, the rib walls project a given length from the mounting wall at the rear surface side, and wherein a cut-out portion is provided on a distal end of each rib wall.

According to such configuration, the rib walls of the clip main body have the projecting portions which project the given length from the rear surface of the mounting hole when the plurality of elastic engagement pieces are brought into engagement with the mounting hole, these projecting portions configure guides when the clip main body is inserted into the mounting hole, thereby the inserting workability of the clip main body being increased.

In addition, since the cut-out portions are provided in part of the projecting portions of the rib walls, the air flow or liquid fluid inside the mounting-target member is not interrupted, thereby maintaining the measuring accuracy of the temperature sensor.

According to still another aspect of the present invention, there may be provided the temperature sensor mounting unit, wherein the elastic engagement pieces and the rib walls are formed to surround the installation hole so that, in the mouthed state, the temperature sensor is surrounded by the elastic engagement pieces and the rib walls.

According to such configuration, since the temperature sensor is surrounded by the plurality of elastic engagement pieces and the plurality of rib walls, the protection of the temperature sensor can be realized. In addition, the temperature sensor is disposed on the rear side of the mounting wall through the mounting hole, no further hole into which the temperature sensor is to be inserted needs to be provided in the mounting wall. Consequently, only one hole has to be provided, and the construction is simplified.

According to still another aspect of the present invention, there may be provided the temperature sensor mounting unit, wherein tongue pieces are provided on the inner circumference of the mounting hole, wherein, in the mounted state, the tongue pieces are brought into abutment with the cut-out portions, and wherein a bottom surface of the cut-out portion is positioned closer to the base plate than an engagement surface of the elastic engagement piece, the engagement surface being brought into engagement with the circumferential edge of the mounting hole.

According to such configuration, since the tongue pieces are provided on the inner circumference of the mounting hole, when the clip main body is inserted into the mounting hole, the tongue pieces are brought into abutment with the cut-out portions in the rib walls, whereby a further push-in of the clip main body can be restricted and the projecting amount of the temperature sensor towards the rear side of the mounting hole can be surely adjusted.

According to still another aspect of the present invention, there may be provided the temperature sensor mounting unit, wherein an accommodation portion is formed on the base plate to extend from the installation hole, and wherein the accommodation portion has a bottomed cylindrical shape so as to accommodate the temperature sensor thereinside.

According to such configuration, by the sensor being inserted into the bottomed cylindrical sensor accommodation portion which is made to extend from the circumferential edge on the rear side of the installation hole provided in the base plate, the sensor can be installed in the base plate in such a state that an outer circumference of the temperature sensor is protected. In addition, since the rear side of the installation hole is closed by the bottomed cylindrical sensor accommodation portion, the sealing performance for the mounting hole can be increased.

According to still another aspect of the present invention, there may be provided the temperature sensor mounting unit, wherein, on each rib wall, a plurality of cut-out portions are formed as the cut-out portion, and wherein, on each rib wall, depths of the cut-out portions from the distal end of the rib wall are different from one another.

According to such configuration, since the cut-out portion is made up of the plurality of cut-out portions whose projecting heights are different, for example, by providing tongue pieces and by adjusting width thereof in accordance with a wall thickness, the projecting amount of the temperature sensor can be controlled regardless of the wall thickness.

According to still another aspect of the present invention, there may be provided the temperature sensor mounting unit, wherein the elastic seal member is a washer made of an elastic material.

According to such configuration, since the elastic seal member is made into the washer which is made of the elastic material, even though the thickness of the mounting wall of the mounting-target member differs largely from place to place, the difference in thickness can be dealt with flexibly by changing washers as required.

According to still another aspect of the present invention, there may be provided the temperature sensor mounting unit, wherein the elastic seal member is an umbrella-shaped flange that expands obliquely outwards from a rear side of the base plate and that is formed integrally with the clip main body.

According to such configuration, since the elastic seal member is made up of the umbrella-shaped flange which is formed integrally on the clip main body, the number of components can be reduced while eliminating a labor hour for installing the elastic seal member on the clip main body, thereby increasing the mounting workability of the elastic seal member.

DETAILED DESCRIPTION OF THE EMBODIMENTS

Figure 1:
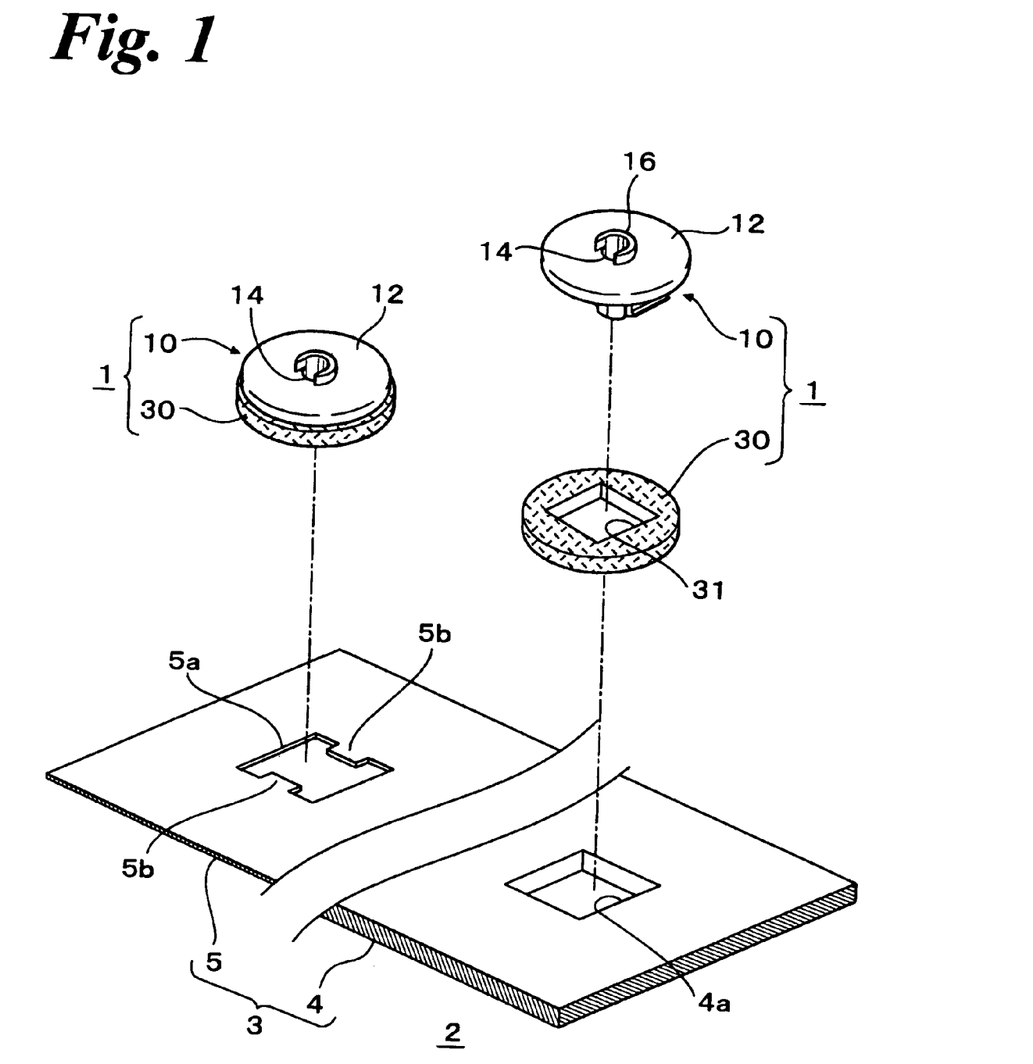
FIG. 1 is a perspective view showing a temperature sensor mounting unit according to an embodiment of the invention.
Figure 2A:
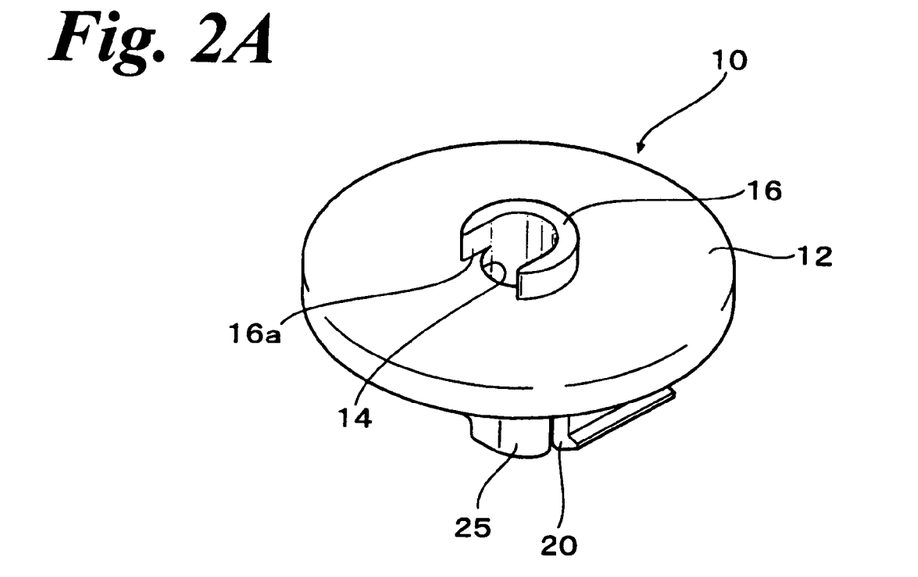
FIGS. 2A and 2B are drawings showing a clip main body which makes up the same mounting unit is shown, FIG. 2A being a perspective view as seen from a front surface side, FIG. 2B being a perspective view as seen from a rear surface side.
Figure 2B:
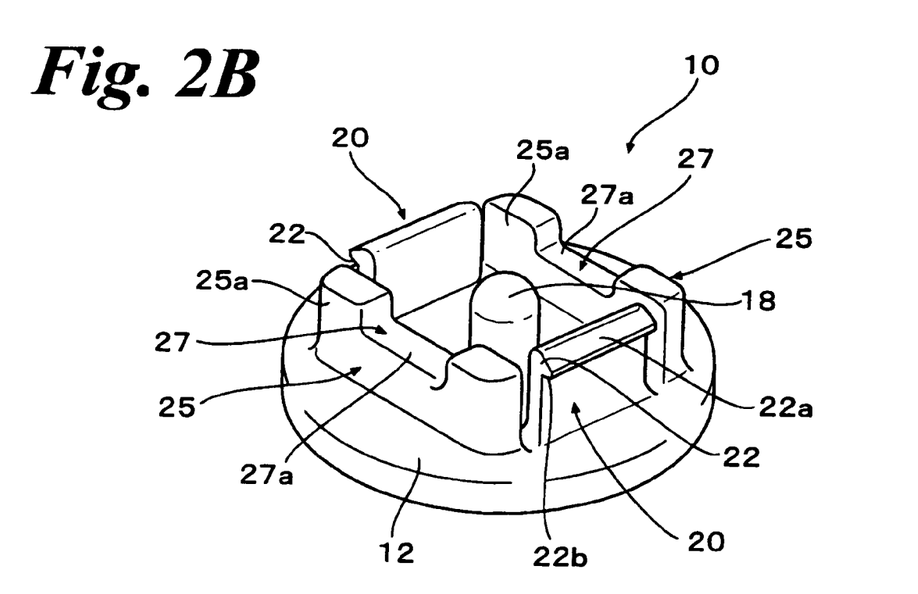
Figure 3A:
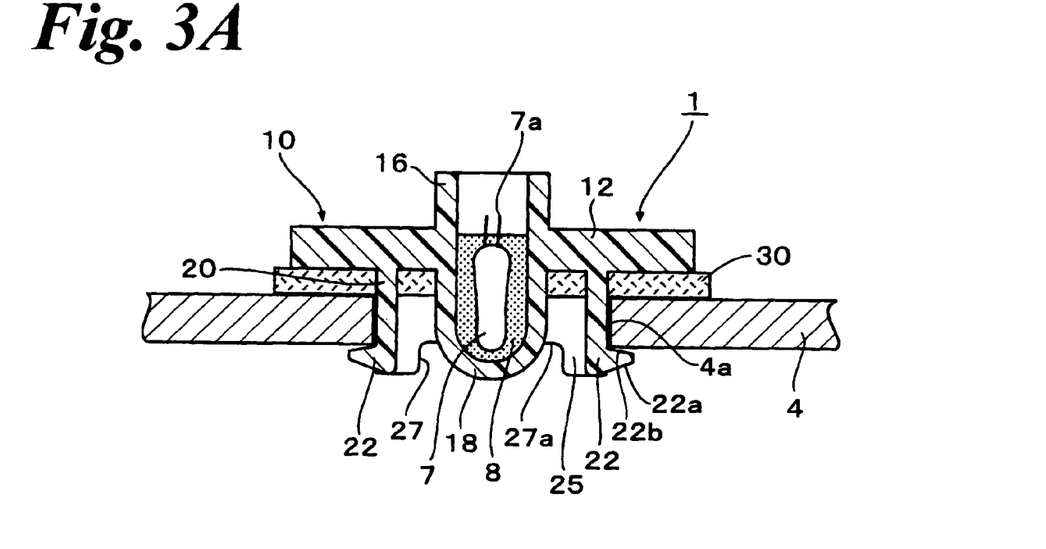
FIGS. 3A and 3B are drawings showing a state in which a temperature sensor is mounted in a mounting hole in a thick mounting wall by the same mounting unit, FIG. 3A being a sectional view thereof, FIG. 3B being a sectional view taken along a plane orthogonal to FIG. 3A.
Figure 3B:
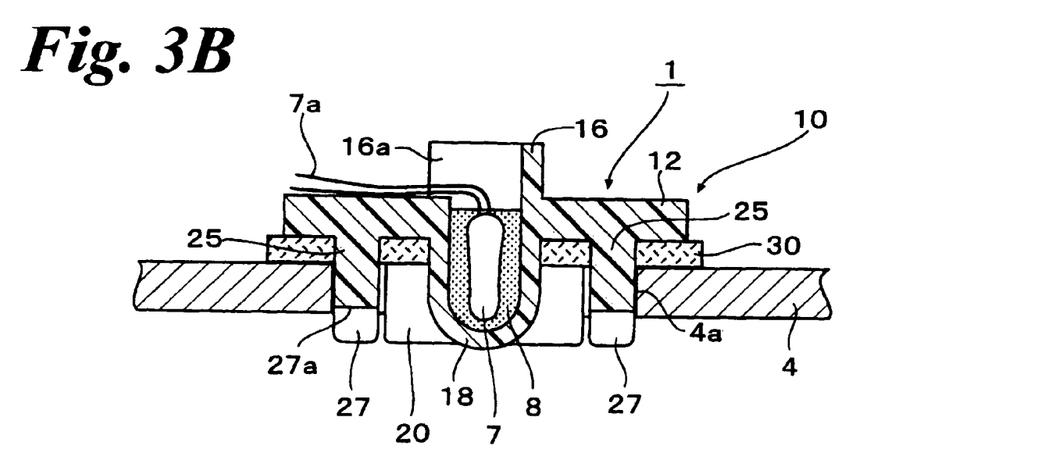
Figure 4A:
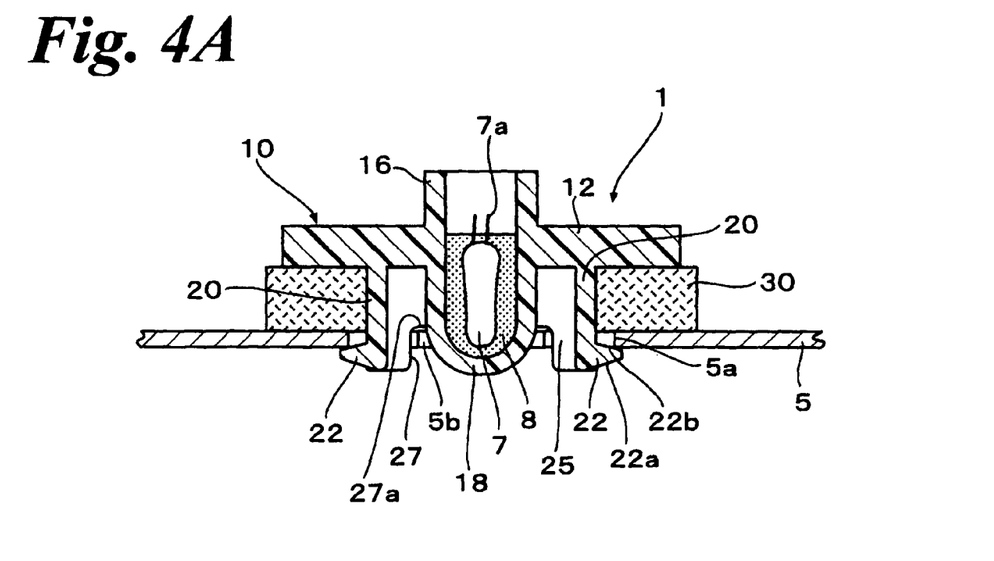
FIGS. 4A and 4B and drawings showing a state in which a temperature sensor is mounted in a mounting hole in a thin mounting wall by the same sensor mounting unit, FIG. 4A being a sectional view thereof, FIG. 4B being a sectional view showing a state in which tongue pieces of the mounting hole being in abutment with cut-out portions in rib walls.
Figure 4B:
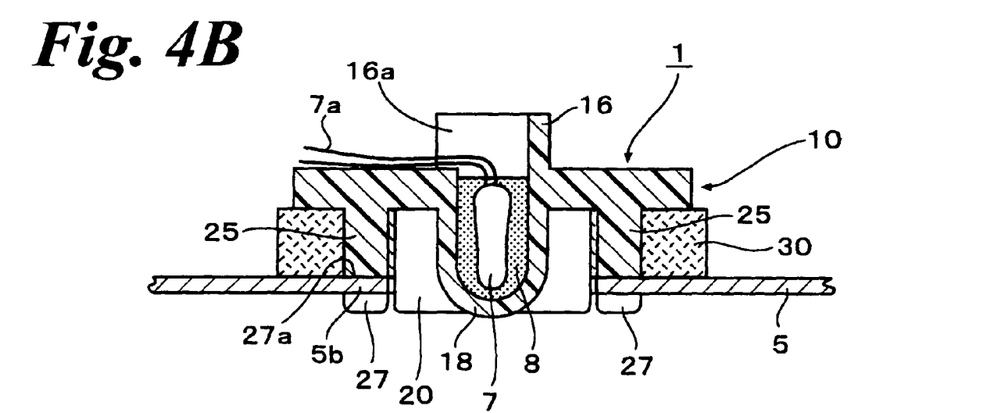
Figure 5A:
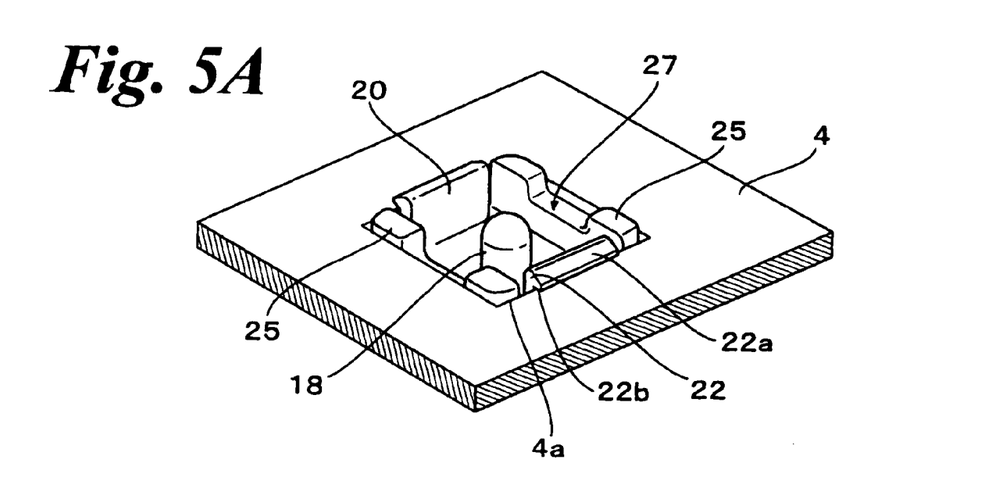
FIGS. 5A and 5B are drawings showing states in which a temperature sensor is mounted in a mounting hole by the same mounting unit, FIG. 5A being a perspective view showing a state as viewed from a rear surface side in which the temperature sensor is mounted in the mounting hole in the thick mounting wall, FIG. 5B being a perspective view showing a state as viewed from a rear surface side in which the temperature sensor is mounted in the mounting hole in the thin mounting wall.
Figure 5B:
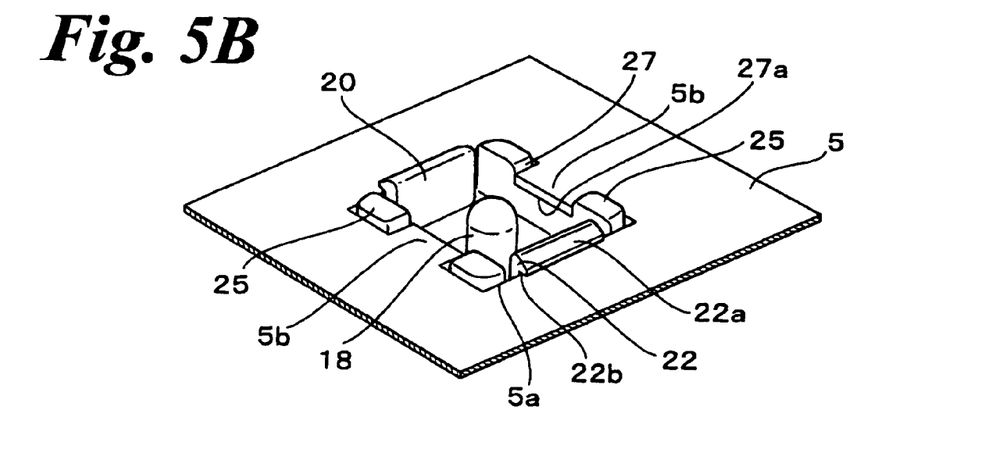

Hereinafter, referring to FIGS. 1 to 5B, a temperature sensor mounting unit according to an embodiment of the invention will be described. FIG. 1 is a perspective view showing a temperature sensor mounting unit according to the embodiment. FIGS. 2A and 2B show a clip main body which makes up the same mounting unit, FIG. 2A being a perspective view as seen from a front surface side, FIG. 2B being a perspective view as seen from a rear surface side. FIGS. 3A and 3B show a state in which a temperature sensor is mounted in a mounting hole in a thick mounting wall by the same mounting unit, FIG. 3A being a sectional view thereof, FIG. 3B being a sectional view taken along a plane orthogonal to FIG. 3A. FIGS. 4A and 4B show a state in which a temperature sensor is mounted in a mounting hole in a thin mounting wall by the same sensor mounting unit, FIG. 4A being a sectional view thereof, FIG. 4B being a sectional view showing a state in which tongue pieces of the mounting hole being in abutment with cut-out portions in rib walls. FIGS. 5A and 5B show states in which a temperature sensor is mounted in a mounting hole by the same mounting unit, FIG. 5A being a perspective view showing a state as viewed from a rear surface side in which the temperature sensor is mounted in the mounting hole in the thick mounting wall, FIG. 5B being a perspective view showing a state as viewed from a rear surface side in which the temperature sensor is mounted in the mounting hole in the thin mounting wall.

As is shown in FIG. 1, a temperature sensor mounting unit 1 (hereinafter, referred to as a "mounting unit 1") is designed to mount a temperature sensor 7 (refer to FIGS. 3A to 4B) including thermistor or thermocouple to be positioned inside a space defined by a mounting wall 3 through mounting holes 4a, 5a formed in the mounting wall 3, for measuring a inside temperature of the mounting target member 2. In this embodiment, the temperature sensor 7 is mounted in the mounting wall 3 which configures an outer casing of a battery (the mounting target member 2) of an electric vehicle for measuring an inside atmosphere of the battery.

In the mounting wall 3 of the embodiment, a thickness differs from place to place, and a thick mounting wall 4 and a thin mounting wall 5 which is thinner than the thick mounting wall 4 are provided. Quadrangular mounting holes 4a, 5a are formed in the mounting walls 4, 5, respectively. A pair of tongue pieces 5b, 5b are provided on a pair of facing inner sides of the mounting hole 5a to project inwards. Each mounting hole may be formed into a polygonal shape, a circular hole, a long hole or the like, as long as it matches the shape of a clip main body 10 to be mounted therein.

In the embodiment, the temperature sensor mounting unit is used to mount the temperature sensor 7 on the mounting wall 3 which configures the outer casing of the battery. However, the invention is not limited thereto. For example, the temperature sensor mounting unit of the invention may be used to mount a temperature sensor on a circumferential wall (a mounting wall) of an exhaust pipe (a mounting target member) for measuring the temperature of exhaust gas discharged from an internal combustion engine, or to mount a temperature sensor on a circumferential wall (a mounting wall) of a coolant supply pipe (a mounting target member) for measuring the temperature of a coolant supplied to the internal combustion engine.

As is shown in FIG. 1, this mounting unit 1 includes a clip main body 10 which is mounted in the mounting holes 4a, 5a and an elastic seal member 30 which is interposed between the clip main body 10 and the mounting wall 3.

As is shown in FIGS. 2A and 2B, the clip main body 10 of this embodiment has a disk-shaped base plate 12 in a center of which a circular installation hole 14 is provided. At a front side of the base palate 12, a lead wire guide wall 16 is provided along a circumferential edge of the installation hole 14 to erect therefrom, and an opening 16a is provided on a part of the circumferential wall, whereby the lead wire guide wall 16 has a substantially C-shaped cross section. At a rear side of the base plate 12, a bottomed cylindrical sensor accommodation portion 18 made up of a cylindrical wall and a semispherical bottom portion is provided on a circumferential edge of the installation hole 14 to extend therefrom.

As is shown in FIGS. 3A to 4B, the temperature sensor 7 is inserted into the sensor accommodation portion 18 through the installation hole 14, and lead wires 7a of the temperature sensor 7 are drawn out from the opening 16a of the lead wire guide wall 16 so as to be disposed in a given position. Thereafter, a synthetic resin 8 such as an epoxy resin having adhesion is filled in the sensor accommodation portion 18, whereby the temperature sensor 7 is fixed in place within the sensor accommodation portion 18 and installed in the installation hole 14.

As is shown in FIG. 2A, a pair of elastic engagement pieces 20, 20 are provided on a rear surface side of the base plate 12 so as to extend therefrom and so as to face each other with respect to the sensor accommodation portion 18 as a center. An engagement claw 22 having a given height is provided on an outside of a distal end of each elastic engagement piece 20. An outer surface of this engagement claw 22 is formed into a tapered surface 22a whose height is gradually reduced towards the distal end thereof, so that the elastic engagement piece 20 is smoothly inserted into the mounting holes 4a, 5a. A distal portion side (a base plate 12 side) of the engagement claw 22 is formed into a stepped engagement surface 22b which is to be brought into engagement with circumferential edges of the mounting holes 4a, 5a from the rear sides. The number of elastic engagement pieces is not limited to two but may be provided more than that.

A pair of rib walls 25, 25 are provided along an inner circumference of each of the mounting holes 4a, 5a between the pair of elastic engagement pieces 20, 20 to be at right angles thereto. A distal end portion of the rib wall 25 is made into a projecting portion 25a so as to project a given length from rear surfaces of the mounting holes 4a, 5a in a state where the elastic engagement piece 20 is brought into engagement with the mounting holes 4a, 5a (refer to FIGS. 3A to 5B). The number of rib walls 25 is not limited to two but may be provided more than that.

As is shown in FIG. 2B, in this embodiment, a cut-out portion 27 is formed in a width matching the tongue piece 5b and a given depth in a center in a width direction of the projecting portion 25a of the rib wall 25. When the clip main body 10 is pushed into the mounting hole 5a, the tongue pieces 5b are respectively aligned with the cut-out portions 27 and are pushed down to bottom surfaces 27a of the cut-out portions 27, whereby a further push-in of the clip main body 10 is restricted (refer to FIG. 4B). When the tongue pieces 5b come into abutment with the bottom surfaces 27a of the corresponding cut-out portions 27, the engagement surfaces 22b of the elastic engagement pieces 20 project to the circumferential edge on the rear side of the mounting hole 5a to be brought into engagement therewith.

In this embodiment, the sensor accommodation portion 18 projects from the rear side of the base plate 12 to be surrounded by the pair of elastic engagement pieces 20, 20 and the pair of rib walls 25, 25 which are disposed at right angles to the pair of elastic engagement pieces 20, 20. According to this configuration, the temperature sensor 7 is positioned inside of the elastic engagement pieces 20 and the rib walls 25 (refer to FIG. 2B).

As is shown in FIG. 1, the elastic seal member 30 is attached to the clip main body 10. In this embodiment, the elastic seal member 30 is made of an elastic material such as a rubber or sponge, an elastic elastomer and the like and is made into a disk-shaped washer which is made slightly wider in diameter than the base plate 12, and the elastic seal member 30 has a quadrangular through hole 31 in a center thereof. When the elastic engagement pieces 20 and the rib walls 25 of the clip main body 10 are pushed into the through hole 31, the engagement claws 22 of the elastic engagement pieces 20 are brought into engagement with the through hole 31 at a rear side, whereby the elastic seal member 30 is temporarily fixed to the clip main body 10.

Next, how to use the mounting unit 1 according to the embodiment will be described below.

To start with, the temperature sensor 7 is installed in the installation hole 14 in the clip main body 10. Namely, the temperature sensor 7 is inserted into the sensor accommodation portion 18, and the synthetic resin 8 such as epoxy resin is filled in the sensor accommodation portion 18 while drawing out the lead wires 7a of the temperature sensor 7 from the opening 16a in the lead wire guide wall 16, whereby the temperature sensor 7 is fixed within the sensor accommodation portion 18, that is within the installation hole 14 (refer to FIGS. 3A to 4B).

Since the temperature sensor 7 is inserted into the sensor accommodation portion 18, an outer circumference thereof can be protected. In addition, since the rear side of the installation hole 14 is closed by the bottomed-cylindrical sensor accommodation portion 18, a leakage of air between inside and outside of a space defined by the mounting wall 3 can be prevented.

Following this, the clip main body 10 on which the temperature sensor 7 is installed is inserted into the mounting hole 4a, 5a in the mounting-target member 2 so as to be mounted therein. FIGS. 3A and 3B show the state where the clip main body 10 is mounted on the thick mounting wall 4, and shown in FIG. 5A is the perspective view as seen from the rear side of the mounting hole which illustrates the state in which the clip main body 10 is mounted on the thick mounting wall 4. On the other hand, FIGS. 4A and 4B show the state where the clip main body 10 is mounted on the thin mounting wall 5, and shown in FIG. 5B is the perspective view as viewed from the rear side of the mounting hole which illustrates the state where the clip main body 10 is mounted on the thin mounting wall 5.

Namely, when the clip main body 10 is pushed into the mounting hole 4a in the thick mounting wall 4 with the elastic engagement pieces 20 and the rib walls 25 aligned therewith, the rib walls 25 are inserted into the inner circumference of the mounting hole 4a while being guided by the projecting portions 25a, and the elastic engagement portions 20 are inserted similarly. In this way, by providing the projecting portions 25a on the rib walls 25 to project from the rear surface of the mounting hole, the inserting workability can be increased.

When the clip main body 10 is further-pushed, the elastic seal member 30 interposed between the base plate 12 and the mounting wall 4 is gradually compressed, and the tapered surfaces 22a are pressed against by the inner circumference of the mounting hole 4a, whereby the elastic engagement pieces 20 are deflected inwards. Then, the projecting portions 25a of the rib walls 25 project from the rear side of the mounting hole 4a, and the engagement claws 22 pass through the mounting hole 4a so as to extend to the rear side of the mounting hole 4a, whereupon the engagement surfaces 22b of the engagement claws 22 are brought into engagement with the circumferential edge on the rear side of the mounting hole 4a, and the compressed elastic seal member 30 is brought into elastic abutment with the front side of the mounting hole 4a, whereby the temperature sensor 7 can be mounted in the mounting hole 4a in such a state that the mounting hole 4a is sealed along the circumferential edge on the front side thereof (refer to FIGS. 3A and 5A).

On the other hand, a way in which the clip main body 10 is mounted in the mounting hole 5a in the thin mounting wall 5 is basically similar to the one in which the clip main body 10 is mounted in the mounting hole 4a in the thick mounting wall 4. Namely, after the cut-out portions 27, 27 of the pair rib walls 25 are aligned with the corresponding tongue pieces 5b, 5b of the mounting hole 5a, the clip main body 10 is pushed into the mounting hole 5a, whereby the rib walls 25 and the elastic engagement pieces 20 are inserted into the inner circumference of the mounting hole 5a. When the clip main body 10 is further-pushed, the tongue pieces 5b come into abutment with the bottom surfaces 27a of the cut-out portions 27 in the corresponding projecting portions 25a, whereby a further push-in of the clip main body 10 is restricted (refer to FIG. 4B). In this state, the engagement claws 22 pass through the mounting hole 4a to the rear side thereof, and the engagement surfaces 22b of the engagement claws 22 come into engagement with the circumferential edge on the rear side of the mounting hole 5a so as to be fixed thereto. By this, the elastic seal member 30 is brought into elastic abutment with the front side of the mounting hole 5a. Consequently, the temperature sensor 7 is mounted in the mounting hole 5a, while the mounting hole 5a is sealed along the circumferential edge on the front side thereof (refer to FIGS. 4A and 5B).

In this mounting unit, the temperature sensor 7 can be mounted on the mounting-target member 2 via the clip main body 10 by the simple construction in which only the mounting holes 4a, 5a are provided in the thick mounting wall 4 and the thin mounting wall 5, respectively, which make up the mounting wall 3 of the mounting-target member 2, whereby the mounting workability can be increased.

In this mounting unit 1, even though the thickness of the mounting wall 3 differs from place to place, since the engagement surfaces 22b of the elastic engagement pieces 20 are held in the positions where they are in engagement with the circumferential edge on the rear side of the mounting hole 4a, 5a by the elastic member 30, the projecting amount of the sensor accommodation portion 18 to the rear surface side of the mounting wall 3 can be maintained constant. As a result, the interference of the temperature sensor 7 with other members disposed in the interior of the mounting-target member 2 can be prevented, and the projecting amount of the sensor accommodation portion 18 to the rear surface side of the mounting wall 3 is made constant, whereby the occurrence of a variation of measured values can be prevented.

When the temperature sensor 7 is mounted in the mounting hole 5a in the thin mounting wall 5, the tongue pieces 5b on the inner circumference of the mounting hole 5a are inserted into the cut-out portions 27 in the projecting portions 25a of the clip main body 10 and are then brought into abutment with the corresponding bottom surfaces 27a thereof, whereby a further push-in of the clip main body 10 is restricted (refer to FIG. 4B). Consequently, the temperature sensor 7 can be mounted while controlling the projecting amount of the temperature sensor 7 to the rear side of the mounting hole. Further, when the clip main body 10 is mounted, since the elastic engagement pieces 20, the rib walls 25 and the sensor accommodation portion 18 are prevented from being pushed inwards abruptly and brought into contact with internal components of the mounting-target member 2, the sensor accommodation portion 18 and the temperature sensor 7 are prevented from being damaged.

In this mounting unit 1, the elastic seal member 30 is interposed between the base plate 12 of the clip main body 10 and the mounting-target member 2, and the airtightness at the circumferential edge on the front side of the mounting hole 4a, 5a is increased. As a result, inward and outward airflow through the mounting hole 4a, 5a is prevented, whereby the ambient temperature environment of the temperature sensor 7 can be maintained constant, and therefore, an accurate temperature measurement can be implemented by the temperature sensor 7.

In this embodiment, since the cut-out portions 27 are provided in the projecting portions 25a of the individual rib walls 25 of the clip main body 10, the air flow inside the mounting-target member is not prevented, whereby inside air is naturally brought into contact the periphery of the temperature sensor 7.

In this embodiment, since the sensor accommodation portion 18 which accommodates the temperature sensor 7 therein is surrounded by the elastic engagement pieces 20, 20 and the rib walls 25, 25, the temperature sensor 7 are protected. In addition, since the temperature sensor 7 can be positioned inwards of the space defined by the mounting wall 3 through the mounting holes 4a, 5a, only one hole is required to be formed in the mounting-target member 2, whereby the construction on the mounting-target member 2 side can be simplified.

Figure 6A:
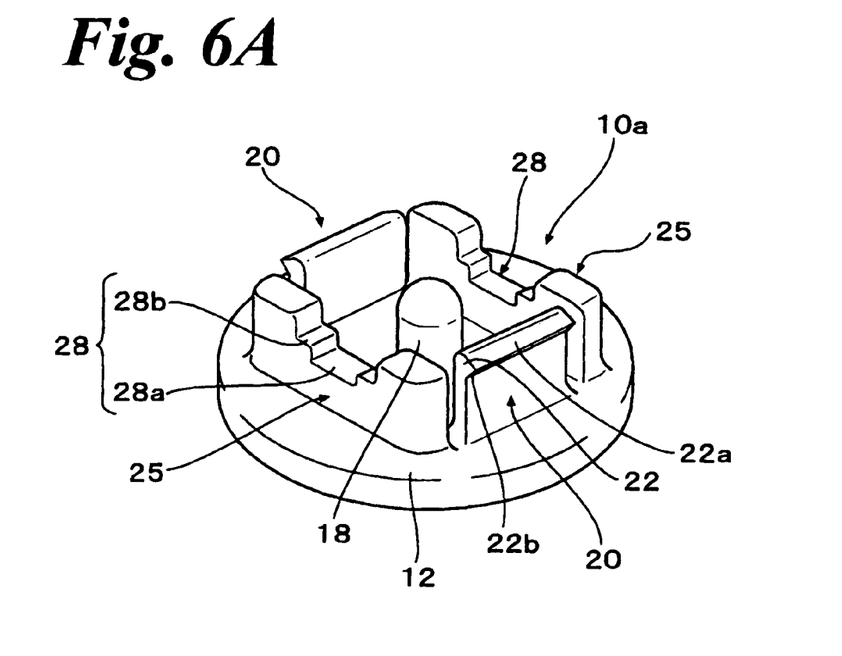
FIGS. 6A and 6B are drawings showing a temperature sensor mounting unit according to another embodiment of the invention, FIG. 6A being a perspective view of a clip main body, FIG. 6B being a perspective view showing a state in which the clip main body is mounted in a mounting hole.
Figure 6B:
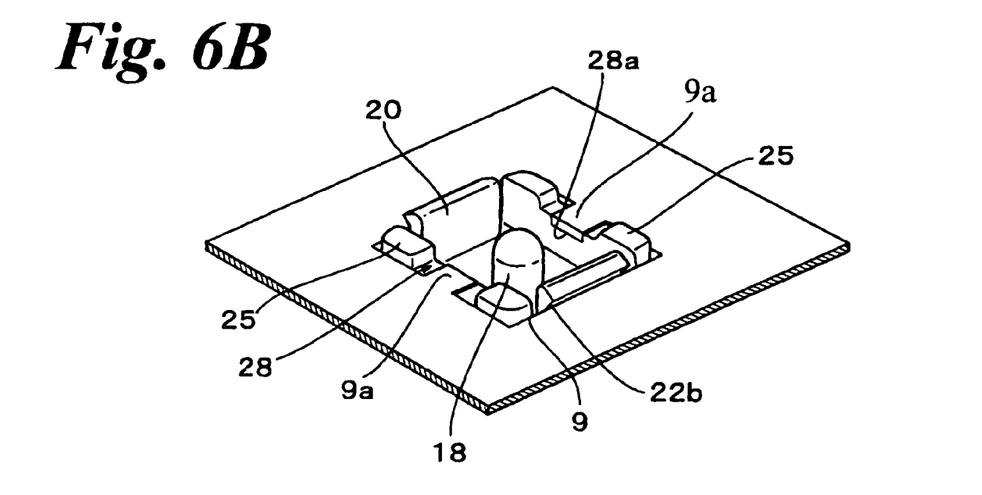

A temperature sensor mounting unit according to another embodiment of the invention is shown in FIGS. 6A and 6B. Like reference numerals will be given to substantially like portions to those of the previous embodiment, and the description thereof will be omitted.

A mounting unit 1 of this embodiment differs from the previous embodiment with respect to the shape of a cut-out portion which is provided in a rib wall 25. Namely, in a clip main body 10a of the mounting unit 1, a cut-out portion 28 has a stepped-shape including a first cut-out portion 28a which is formed in a center in a width direction of the rib wall 25 and a second cut-out portion 28b which is formed on both sides of the first cut-out portion 28a so as to be wider than the first cut-out portion 28a and deeper than the first cut-out portion 28a (refer to FIG. 6A). Two or more such cut-outs may be provided.

In this embodiment, for example, when the mounting unit 1 is applied to a thick mounting wall, no tongue piece is provided on a mounting hole so that the push-in position of the clip main body 10a is not restricted, whereas when the mounting unit 1 is applied to a mounting wall whose thickness is slightly thinner than that of the thick mounting wall, tongue pieces are formed on a mounting hole correspondingly with the first cut-out portions 28a, so that the push-in position of the clip main body 10a is restricted at the first cut-out portion 28a. Further, when the mounting unit 1 is applied to a mounting wall whose thickness is much thinner, tongue pieces are formed correspondingly with the second cut-out portion 28b, so that the push-in position of clip main body 10a is restricted at the second cut-out portion 28b. According to the mounting unit 1 of this embodiment, the push-in position of the clip main body 10a can be restricted from being positioned deeper than a given value relative to the three mounting walls which have the different thicknesses.

Shown in FIG. 6B is a state in which by tongue pieces 9a corresponding to the first cut-out portion 28a being provided on an inner circumference of a mounting hole 9, when the clip main body 10a inserted into the mounting hole 9, the tongue pieces 9a are brought into engagement with the corresponding first cut-out portions 28a, so as to restrict a further push-in of the clip main body 10a.

Figure 7A:
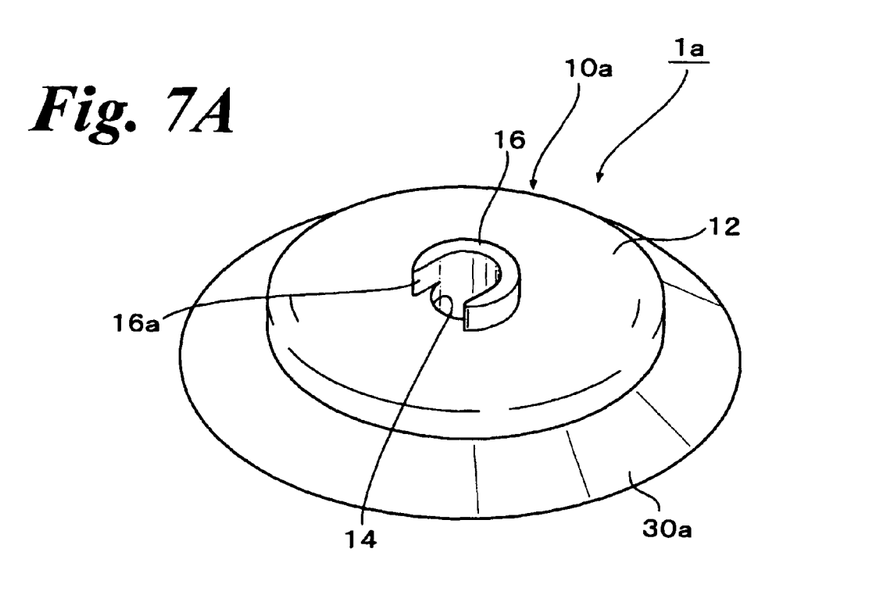
FIGS. 7A and 7B are drawings showing a temperature sensor mounting unit according to still another embodiment of the invention, FIG. 7A being a perspective view, FIG. 7B being a perspective view as seen from an opposite side to FIG. 7A.
Figure 7B:
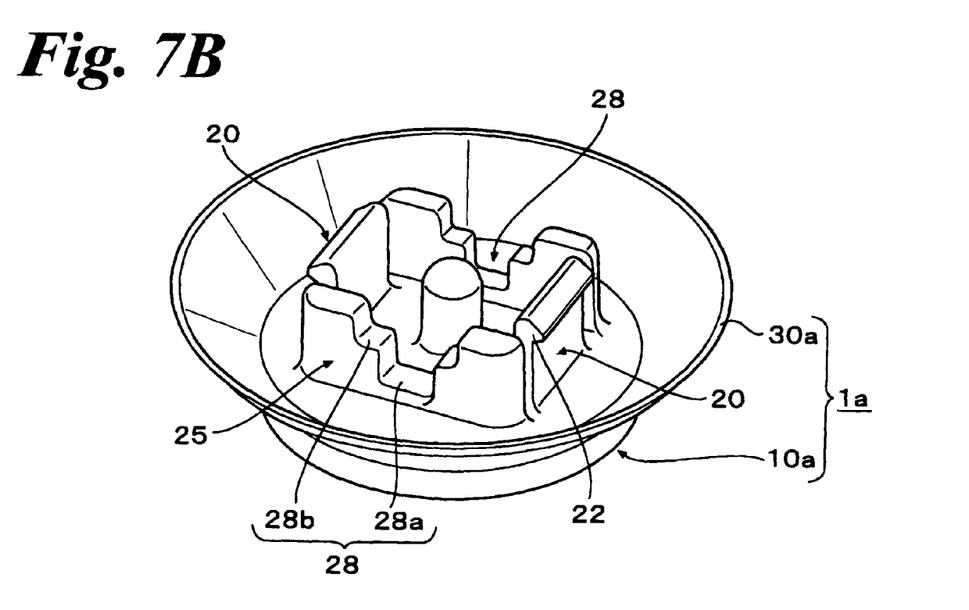

A temperature sensor mounting unit according to still another embodiment of the invention is shown in FIGS. 7A and 7B. Like reference numerals will be given to substantially like portions to those of the previous embodiments, and the description thereof will be omitted.

A temperature sensor mounting unit 1a (hereinafter, referred to as a "mounting unit 1a") of this embodiment differs from the previous embodiments with respect to an elastic seal member. As is shown in FIG. 7B, an elastic seal member 30a of this mounting unit 1a is an integrally-formed umbrella-shaped flange expands obliquely outwards from a rear side of a base plate 12 of a clip main body 10a.

According to the mounting unit 1a, since the elastic seal member 30a is the umbrella-shaped flange formed integrally on the clip main body 10a, the number of components can be reduced, while eliminating a labor hour for installing the elastic seal member 30a on the clip main body 10a, whereby the mounting workability can be increased.

In the embodiments, the installation hole 14 (temperature sensor 7) is positioned so as to be surrounded by the elastic engagement pieces 20 and the rib walls 25. However, the installation hole 14 may be provided outwards of the portion surrounded by the elastic engagement pieces 20 and the rib walls 25, so that the temperature sensor 7 is installed in the installation hole 14 so provided. In this case, a separate hole into which the temperature sensor 7 is to be inserted may be provided in the mounting hole 3.

According to an aspect of the present invention, there is provided a temperature sensor mounting unit to mount the temperature sensor in the mounting hole, in which, by installing the temperature sensor in the installation hole in the clip main body and by inserting the clip main body into the mounting hole, the elastic engagement pieces are brought into engagement with circumferential edge on the rear side of the mounting hole while the elastic seal member is brought into elastic abutment with the front side of the mounting hole. Namely, the temperature sensor can be mounted on the mounting-target member via the clip main body by simply providing the mounting hole in the mounting wall of the mounting-target member, whereby the mounting workability of the temperature sensor can be increased.

In addition, the projecting amount of the temperature sensor from the rear side of the mounting hole is held constant by the elastic seal member formed to deform in accordance with the thickness of the mounting wall of the mounting-target member. As a result, interference of the temperature sensor with internal components of the mounting-target member can be suppressed.

What is claimed is:
1. A temperature sensor mounting unit for mounting a temperature sensor to a mounting-target member at a mounting hole formed on a mounting wall thereof, the temperature sensor mounting unit comprising:
a clip main body including:

a base plate that is to be positioned on a front surface side of the mounting wall, the base plate having an installation hole formed therein, the installation hole allowing the temperature sensor to penetrate into a rear surface side of the mounting wall; and a plurality of elastic engagement pieces that extend from the base plate to be engaged with a circumferential edge of the mounting hole at the rear surface side of the mounting wall; and an elastic seal member configured to be disposed between the clip main body and the mounting wall.

2. The temperature sensor mounting unit according to claim 1, wherein the clip main body further includes:

a plurality of rib walls that are disposed between the plurality of elastic engagement pieces to be disposed along an inner circumference of the mounting hole, wherein, in amounted state, the rib walls project a given length from the mounting wall at the rear surface side, and wherein a cut-out portion is provided on a distal end of each rib wall.

3. The temperature sensor mounting unit according to claim 2, wherein the elastic engagement pieces and the rib walls are formed to surround the installation hole so that, in the mouthed state, the temperature sensor is surrounded by the elastic engagement pieces and the rib walls.

4. The temperature sensor mounting unit according to claim 2, wherein tongue pieces are provided on the inner circumference of the mounting hole, wherein, in the mounted state, the tongue pieces are brought into abutment with the cut-out portions, and wherein a bottom surface of the cut-out portion is positioned closer to the base plate than an engagement surface of the elastic engagement piece, the engagement surface being brought into engagement with the circumferential edge of the mounting hole.

5. The temperature sensor mounting unit according to claim 1, wherein an accommodation portion is formed on the base plate to extend from the installation hole, and wherein the accommodation portion has a bottomed cylindrical shape so as to accommodate the temperature sensor thereinside.

6. The temperature sensor mounting unit according to claim 4, wherein, on each rib wall, a plurality of cut-out portions are formed as the cut-out portion, and wherein, on each rib wall, depths of the cut-out portions from the distal end of the rib wall are different from one another.

7. The temperature sensor mounting unit according to claim 1, wherein the elastic seal member is a washer made of an elastic material.

8. The temperature sensor mounting unit according to claim 1, wherein the elastic seal member is an umbrella-shaped flange that expands obliquely outwards from a rear side of the base plate and that is formed integrally with the clip main body.

* * * * *